(12) United States Patent
Oost et al.

(10) Patent No.: US 8,894,960 B2
(45) Date of Patent: Nov. 25, 2014

(54) PROCESS FOR REMOVING NO AND $N_2O$ FROM GAS MIXTURES

(75) Inventors: Carsten Oost, Bad Dürkheim (DE); Wolfgang Rohde, Speyer (DE); Christian Miller, Deidesheim (DE); Manfred Stroezel, Ilvesheim (DE); Alfred Thome, Speyer (DE); Wilfried Berning, Worms (DE)

(73) Assignee: BASF SE, Ludwigshafen (DE)

( * ) Notice: Subject to any disclaimer, the term of this patent is extended or adjusted under 35 U.S.C. 154(b) by 544 days.

(21) Appl. No.: 12/517,495

(22) PCT Filed: Nov. 30, 2007

(86) PCT No.: PCT/EP2007/063056
§ 371 (c)(1),
(2), (4) Date: Feb. 4, 2010

(87) PCT Pub. No.: WO2008/068194
PCT Pub. Date: Jun. 12, 2008

(65) Prior Publication Data
US 2010/0143226 A1    Jun. 10, 2010

(30) Foreign Application Priority Data
Dec. 4, 2006 (EP) .................................. 06125297

(51) Int. Cl.
*C01C 3/08* (2006.01)
*C01B 21/00* (2006.01)
*C01B 21/20* (2006.01)
*B01D 53/86* (2006.01)
*C01B 21/24* (2006.01)
*C01B 21/14* (2006.01)
*B01D 53/77* (2006.01)

(52) U.S. Cl.
CPC ....... *C01B 21/1418* (2013.01); *B01D 2257/404* (2013.01); *B01D 53/77* (2013.01); *B01D 2255/1021* (2013.01); *B01D 53/8625* (2013.01); *B01D 2255/1023* (2013.01); *B01D 2259/40* (2013.01); *B01D 53/86* (2013.01); *Y02C 20/10* (2013.01); *B01D 2255/20761* (2013.01); *B01D 2257/402* (2013.01); *B01D 2251/202* (2013.01); *C01B 21/24* (2013.01); *B01D 2255/104* (2013.01)
USPC ............................. 423/374; 423/351; 423/387

(58) Field of Classification Search
None
See application file for complete search history.

(56) References Cited

U.S. PATENT DOCUMENTS

| 3,313,595 | A | * | 4/1967 | Meier et al. ................... 423/388 |
| 4,387,082 | A |   | 6/1983 | Grosskinsky et al. |
| 4,507,271 | A |   | 3/1985 | Van Deyck et al. |
| 4,971,776 | A | * | 11/1990 | Van Royen et al. ........... 423/232 |
| 5,236,685 | A | * | 8/1993 | Fuchs et al. ................... 423/387 |
| 5,489,421 | A | * | 2/1996 | Van Velzen et al. .......... 423/387 |
| 5,658,545 | A | * | 8/1997 | Chang et al. ................ 423/239.1 |
| 6,056,928 | A | * | 5/2000 | Fetzer et al. ................... 423/235 |
| 2005/0047987 | A1 | * | 3/2005 | Benneker et al. ............. 423/352 |

FOREIGN PATENT DOCUMENTS

| DE | 1177118 |   | 10/1979 |
| DE | 3244370 |   | 6/1984 |
| DE | 19533715 |   | 3/1997 |
| DE | 10050906 | * | 4/2002 |
| EP | 0059445 |   | 9/1982 |
| EP | 0919278 |   | 6/1999 |
| JP | 54136598 |   | 10/1979 |
| WO | 9308121 | * | 4/1993 |
| WO | WO-93/08121 |   | 4/1993 |
| WO | WO-02/30549 |   | 4/2002 |
| WO | WO-2007/038581 |   | 4/2007 |

OTHER PUBLICATIONS

Benson, Richard, et al. "Synthesis of Hydroxylamine" The Chem Dept, Experimental Station E.I Du Point De Nemours and Co., No. 380, Sep. 5, 1956.*
Paseka, I. "Hydrogenation of Nitric Oxide on Platinum Black in Acidic Solution", React. Kenet. Catal. Lett., vol. 11, No. 1, 85-89 (1979).*
Translation of the International Preliminary Report on Patentability Date of Mailing Jun. 11, 2009.

* cited by examiner

*Primary Examiner* — Melvin C Mayes
*Assistant Examiner* — Sheng H Davis
(74) *Attorney, Agent, or Firm* — Drinker Biddle & Reath LLP

(57) ABSTRACT

A process is proposed for reprocessing the exhaust gas from a plant for producing hydroxylamine or hydroxylammonium salts by catalytic reduction of nitrogen monoxide with hydrogen for the purpose of utilization of at least a part of the nitrogen monoxide and if appropriate hydrogen present in the exhaust gas for producing hydroxylamine or hydroxylammonium salts, which comprises, in a first separation stage, selectively separating off nitrogen monoxide from the exhaust gas of the plant for producing hydroxylamine or hydroxylammonium salts.

20 Claims, No Drawings

PROCESS FOR REMOVING NO AND N₂O FROM GAS MIXTURES

This application is a national phase of PCT/EP2007/063056, filed on Nov. 30, 2007, which claims priority to EP 06125297.9, filed Dec. 4, 2006, the entire contents of all are hereby incorporated by reference.

The invention relates to a process for reprocessing the exhaust gas from a plant for producing hydroxylamine or hydroxyalammonium salts by catalytic reduction of nitrogen monoxide with hydrogen for the purpose of utilization of at least a part of the nitrogen monoxide and if appropriate hydrogen present in the exhaust gas for producing hydroxylamine or hydroxylammonium salts.

In the production of hydroxylamine or hydroxylammonium salts by catalytic hydrogenation of nitrogen monoxide with hydrogen, inter alia dinitrogen monoxide is produced as byproduct. In this case hydrogen is used in great excess and the nitrogen monoxide reacts only in part. This produces exhaust gases which contain hydrogen, nitrogen monoxide, dinitrogen monoxide and inert gases. These mixtures cannot be recycled directly into the synthesis, since otherwise the dinitrogen monoxide would build up and explosive mixtures of hydrogen, nitrogen monoxide and dinitrogen monoxide would form. In addition, the exhaust gas of hydroxylammonium synthesis contains nitrogen which would likewise build up in the event of recirculation to the process and would lead to considerable reduction of the space-time-yield. The exhaust gas is therefore customarily burned, in which case the energy being liberated in this case can be used for steam generation. However, it would be more economically expedient to isolate the valuable materials present in the exhaust gas, in particular nitrogen monoxide and, if appropriate, also hydrogen and dinitrogen monoxide, and if appropriate to recycle them to the process. In this case, however, in particular the dinitrogen monoxide which is inert in the process for producing hydroxylamine and can thus build up, must not be recycled since, as described above, it leads to explosive mixtures. In addition, also build-up of the nitrogen must be avoided, because of the above-described considerable reduction in space-time yield.

Therefore, a number of processes have been proposed in which the dinitrogen monoxide from the exhaust gas of hydroxylamine synthesis comprising hydrogen, nitrogen monoxide, dinitrogen monoxide and inert gases is separated off from the remaining components of the same.

For this, for example in DE-A 032 44 370, a pressure-swing adsorption on molecular sieves is proposed. It is disadvantageous in this process that the gas mixture comprises the aggressive component nitrogen monoxide which is a free radical and rapidly attacks the absorption material so that frequent exchange of same is required. In addition, avoiding explosive gas mixtures is associated with high capital costs.

WO-A 02/30549 describes a further process for separating off dinitrogen monoxide from the exhaust gas of the production of hydroxylamine, more precisely by using semipermeable membranes. In this process also, the aggressiveness of the nitrogen monoxide causes a limited stability of the membranes and therefore limited economic efficiency of the process.

The process of EP-A 0 919 278 proposes reducing the exhaust gas from hydroxylamine synthesis to ammonia in the presence of suitable noble metal catalysts. The ammonia formed can then be passed into the production of nitrogen monoxide, the starting material of hydroxylamine synthesis, whereas the hydrogen can be recycled directly into the hydroxylamine synthesis. It is disadvantageous in this process, however that, despite high conversion rates and complete removal of the nitrogen oxides, the ammonia selectivity appears relatively low, for example 46% for dinitrogen monoxide or 67% for nitrogen monoxide, in such a way that a considerable part of the nitrogen oxides is lost unused. In addition, there is the risk of forming explosive ammonium nitrate and also building up minor components, in particular methane and carbon monoxide, which can lead to poisoning of the catalyst of hydroxylamine synthesis.

It was, on the other hand, an object of the invention to provide an economic process for reprocessing the exhaust gas from a plant for producing hydroxylamine or hydroxylammonium salts by catalytic reduction of nitrogen monoxide with hydrogen for the purpose of reutilization of at least a part of the nitrogen monoxide and, if appropriate, hydrogen present in the exhaust gas.

The object is achieved by a process for reprocessing the exhaust gas from a plant for producing hydroxylamine or hydroxylammonium salts by catalytic reduction of nitrogen monoxide with hydrogen for the purpose of utilization of at least a part of the nitrogen monoxide and if appropriate hydrogen present in the exhaust gas by recycling into the plant for producing hydroxylamine or hydroxylammonium salts, which comprises, in a first separation stage, selectively separating off nitrogen monoxide from the exhaust gas of the plant for producing hydroxylamine or hydroxylammonium salts.

Preferably, utilization of at least a part of the nitrogen monoxide and if appropriate hydrogen present in the exhaust gas proceeds by recycling into the plant for producing hydroxylamine or hydroxylammonium salts.

It has been found in this case that it is essential to feed the exhaust gas of a hydroxylamine synthesis, for the purpose of reutilization of at least a part of the nitrogen monoxide and if appropriate hydrogen present therein to a selective removal of nitrogen monoxide in a first separation stage.

The catalytic reduction of nitrogen monoxide by hydrogen is generally carried out at 30 to 60° C. with the conjoint use of strong mineral acids, in particular sulfuric acid or phosphoric acid, if appropriate with addition of salts, in particular ammonium salts of the abovementioned acids. Generally, this starts from four to six normal aqueous acids. As catalysts, use can be made of suspended noble metal catalysts, in particular supported platinum catalysts, in particular graphite having proved advantageous as support. Activity and selectivity of the catalyst can be set by treatment with organic or inorganic compounds, in particular sulfurous compounds. Such a process is disclosed, for example, by DE-C 11 77 118.

The reaction is carried out under a great hydrogen excess, and the nitrogen monoxide is only partially reacted. This produces an exhaust gas, the composition of which typically comprises, in % by volume, 50 to 90% hydrogen, 0.5 to 25% nitrogen monoxide, 0.5 to 15% dinitrogen monoxide, 0 to 20% nitrogen and 0 to 18% water.

According to the invention, nitrogen monoxide is absolutely removed from the exhaust gas in a first separation stage. This ensures that it cannot attack the materials used in the subsequent separation stages, and also that the nitrogen monoxide from the exhaust gas can be virtually completely used for generating hydroxylamine, which avoids it being in part lost in subsequent separation stages.

In a particularly preferred process variant, the selective removal of nitrogen monoxide can proceed in a reactor for producing hydroxylamine or hydroxylammonium sulfate which reactor is designed for complete conversion of the nitrogen monoxide. In particular, the nitrogen monoxide can be removed in this manner in a separate reactor downstream of the main reactor of the hydroxylamine synthesis. In this case the space-time yield of this reactor, based on hydroxylamine or hydroxylammonium sulfate, can be 30 to 60% below the space-time yield of the main reactor.

In a further embodiment variant, the selective removal of nitrogen monoxide in the first separation stage can be carried out by absorption to a suitable absorbent.

Suitable absorbents are, in particular, transition metal-comprising solid or liquid materials which bind nitrogen monoxide reversibly as nitrosyl complex. For example, iron sulfate in aqueous solution forms nitrosyl complexes which can be cleaved back to the starting compounds at elevated temperature.

In addition, transition metal-comprising solid-phase absorbents, for example transition metal-exchanged zeolites, can also be used.

From the residual gas which remains after removal of nitrogen monoxide in the first separation stage, the dinitrogen monoxide can be selectively removed in a second separation stage. For this, use can be made of physical processes which are based on differing absorption properties of the gases, in particular pressure-swing absorption to liquid or solid absorbents, in addition membrane processes or low-temperature fractionation. In this case the dinitrogen monoxide can be isolated as a material of value.

Chemical processes which come into consideration are, in particular, reaction to form ammonia or nitrogen and water.

In one embodiment, dinitrogen monoxide, in the second separation stage, is selectively reacted to form ammonia in the presence of suitable catalysts, for example corresponding to the process of EP-A 0 919 278 set forth at the outset or else in the presence of nickel- or cobalt-comprising zeolite catalysts as are described in JP-A 54136598. The ammonia obtained by reaction of dinitrogen monoxide can preferably be fed to an ammonia combustion furnace for producing nitrogen monoxide.

In a further embodiment variant, the dinitrogen monoxide, in the second separation stage, is selectively reduced with hydrogen to form nitrogen and water. This is possible either in the thermal route, at a high temperature of above 500° C., or else catalytically.

Suitable catalysts for the catalytic reduction of dinitrogen monoxide to form nitrogen and water are various transition metal catalysts which comprise metallic components, oxidic components or mixtures of metallic and oxidic components. Suitable catalysts are based, for example, on platinum, palladium, silver or else gold particles which are deposited on a support material. In addition, suitable catalysts are transition metal-doped zeolites or else transition metal-free zeolites, in addition catalysts based on copper-zinc-aluminum spinels and other copper oxides or iron oxide on titanium dioxide. Particularly suitable catalysts are based on the noble metals platinum, palladium and/or silver and also on copper oxide-comprising preparations. Preference is given to catalysts comprising, as active components, one or more of the metals, silver, palladium, platinum or copper, or one or more compounds of these metals, advantageously on aluminum oxide-comprising support materials, in particular those catalysts whose ignition temperature is below 100° C.

In order to avoid the entrainment of catalyst poisons, especially sulfuric acid, from the synthesis of hydroxylamine in the catalyst bed for the catalytic reduction of dinitrogen monoxide, the exhaust gas stream comprising dinitrogen monoxide can be conducted through an absorber tower or via a gas scrubber. The gas leaving the catalyst bed for the catalytic reduction of dinitrogen monoxide can comprise small amounts of ammonia, which can be formed in a secondary reaction. This ammonia can be separated for example also in an absorber tower or in a gas scrubber. However, the ammonia can also be separated, at least partially, from the exhaust gas of the catalytic reduction of dinitrogen monoxide as ammoniacal solution by condensing. Moreover, it is also possible to separate first the water by condensing or absorption from the exhaust gas stream of the catalytic reduction of dinitrogen monoxide and afterwards the ammonia in pure form.

Since the exhaust gas of the hydroxylamine plant generally also comprises inert nitrogen, or this can additionally be formed in the chemical processes of the second separation stage, it can be advantageous to subject the residual gas of the second separation stage to removal of hydrogen from nitrogen and also other components inert in the process for producing hydroxylamine in a third separation stage. For this, membrane processes in particular are suitable.

The invention also relates to a process for producing hydroxylamine or hydroxylammonium salts, wherein the exhaust gas from the hydroxylamine or hydroxylammonium salt synthesis is reprocessed by one of the above-described processes, in particular that one of the valuable materials produced in the reprocessing of the exhaust gas nitrogen monoxide and hydrogen is used for producing hydroxylamine or hydroxylammonium salts. Preference is given to a process in which at least one of the valuable materials produced in the reprocessing of the exhaust gas, nitrogen monoxide and hydrogen, are recirculated to the hydroxylamine synthesis process.

Comparison of the feed figures for nitrogen monoxide and hydrogen for a process for producing hydroxylamine without recovery shows that, per tonne of hydroxylamine, 1420 $Nm^3$ of hydrogen and 800 $Nm^3$ of nitrogen monoxide are required, but using the removal of nitrogen monoxide and hydrogen according to the invention with recycling to the hydroxylamine plant, only 1146 $Nm^3$ of hydrogen and 692 $Nm^3$ of nitrogen monoxide are required.

The invention will be described in more detail hereinafter with reference to examples.

EXAMPLE 1

Selective removal of nitrogen monoxide in a reactor for synthesis of hydroxylammonium sulfate.

In a 50 $m^3$ stirred tank, 32 $m^3$/h of a suspension of 30 g/l of catalyst (0.5% Pt on graphite) in sulfuric acid (16.6% by weight) were pumped continuously. The liquid level in the stirred tank was approximately 75%. Into the liquid in the stirred tank were introduced at 39.2° C., 1100 $Nm^3$/h of exhaust gas from a hydroxylamine plant comprising 73.9% by volume $H_2$, 18.0% by volume NO, 3.8% by volume $N_2O$ and 4.3% by volume $N_2$. In this case the NO was virtually completely reacted to form hydroxylammonium sulfate. 450 $Nm^3$/h of exhaust gas comprising 84.4% by volume $H_2$, 0.1% by volume NO, 6.8% by volume $N_2O$ and 8.7% by volume $N_2$ left the stirred tank. The conversion rate based on NO was 99.8%.

2nd Separation Stage:
Catalytic Reduction of Dinitrogen Monoxide to Form Nitrogen and Water In a tubular reactor (Ø 25 mm), a mixture of 20 ml of quartz glass chips and 20 ml of catalyst chips was charged. The temperature of the bed was measured at the inlet and in the bed center. The exhaust gas stream introduced into the catalyst bed from a hydroxylamine synthesis comprising 73.3% by volume $H_2$, 8.9% by volume $N_2O$, 5.6% by volume water and 12.2 $N_2$ was heated stepwise by means of a preheating section, and the volumetric flow rate was 200 Nl/h. Ag-comprising catalysts supported on $Al_2O_3$ having differing Ag content were studied with respect to their ignition behavior. The catalysts were produced by impregnation of a γ-$Al_2O_3$ support (pore volume 0.7 ml/g, specific surface area 200 $m^2$/g) with aqueous silver nitrate solution and subsequent calcination at 700° C. Table 1 hereinafter summarizes the temperatures at the bed center at which 50% conversion rate and at which complete conversion are achieved:

TABLE 1

| Catalyst | T (50%) [° C.] | T (100%) [° C.] |
|---|---|---|
| 14% Ag on $Al_2O_3$ | 82 | 158 |
| 5% Ag on $Al_2O_3$ | 82 | 155 |
| 1% Ag on $Al_2O_3$ | 134 | 214 |
| 0.1% Ag on $Al_2O_3$ | 233 | 340 |

EXAMPLE 2

2nd Separation Stage:
Catalytic Reduction of Dinitrogen Monoxide to Form Nitrogen and Water In a tubular reactor (Ø 25 mm) a mixture of 30 ml of quartz glass chips and 10 ml catalyst chips were charged. The temperature of the bed was measured at the inlet and in the bed center. The gas stream introduced into the catalyst bed was heated stepwise by means of a preheating section, and the total volumetric flow rate was 100 NI/h. A gas mixture of the following composition was then introduced: 73.4% by volume $H_2$, 3.1% by volume $N_2O$, 17.6% by volume $N_2$ and 5.9% by volume $H_2O$.

COMPARATIVE EXAMPLE 2C

Following the catalytic reduction of dinitrogen monoxide by the experimental procedure set forth in example 2, a mixture of dinitrogen monoxide and nitrogen monoxide were passed into the tubular reactor, so that the gas composition was 74.1% by volume hydrogen, 1.4% by volume dinitrogen monoxide, 0.9% by volume nitrogen monoxide, 18.6% by volume nitrogen and 5% by volume water.

Table 2 hereinafter gives the temperatures of the bed center at which 50% conversion rate of dinitrogen monoxide or nitrogen monoxide were achieved:

TABLE 2

| Catalyst | T (50% $N_2O$) [° C.] | T (50% NO) [° C.] |
|---|---|---|
| Example 2: 14% Ag on $Al_2O_3$ (without NO) | 69 | — |
| Example 2C: 14% Ag on $Al_2O_3$ (with NO) | 99 | 81 |

The table shows that, by means of the process of the invention, it is possible in a simple manner to remove nitrogen monoxide selectively from the exhaust gas of a hydroxylamine synthesis in a first process step, with further reprocessing of the exhaust gas for removal of the dinitrogen monoxide being possible in a second separation stage in the presence of very simple nonspecific catalysts for reducing nitrogen oxides, more precisely in the presence of aluminum oxide-supported silver-comprising catalysts.

According to table 2, for a mixture of NO and $N_2O$, 50% conversion rate for NO is achieved even at a temperature of the bed center of 81° C., but 50% conversion rate for $N_2O$ is not achieved until 99° C.

Therefore, the use of these simple nonspecific catalysts for reprocessing the exhaust gas from hydroxylamine synthesis would not be possible without the removal according to the invention of nitrogen monoxide in a first separation stage, because in this case nitrogen monoxide is reduced more readily at lower bed temperatures, and therefore for utilization of the same from the exhaust gas of hydroxylamine synthesis by catalytic reduction, highly specific catalysts for dinitrogen monoxide would first have to be developed.

The invention claimed is:

1. A process for reprocessing the exhaust gas from a plant for producing hydroxylamine or hydroxylammonium salts by catalytic reduction of nitrogen monoxide with hydrogen for the purpose of utilization of at least a part of the nitrogen monoxide and if appropriate hydrogen present in the exhaust gas from a main reactor for producing hydroxylamine or hydroxylammonium salts, which comprises, in a first separation stage, selectively separating off nitrogen monoxide from the exhaust gas of the plant for producing hydroxylamine or hydroxylammonium salts and wherein a second separation stage is provided in which dinitrogen monoxide is removed from a residual gas of the first separation stage,
wherein the selective removal of nitrogen monoxide is carried out in a reactor for producing hydroxylamine or hydroxylammonium salts by catalytic reduction of nitrogen monoxide with hydrogen, which reactor is designed for complete conversion of the nitrogen monoxide, and which reactor is a separate reactor downstream from the main reactor, wherein said separate reactor downstream of the main reactor has a space-time yield, based on hydroxylamine or hydroxylammonium sulfate, of 30 to 60% below the space-time yield of the main reactor.

2. The process according to claim 1, wherein the utilization of at least a part of the nitrogen monoxide and if appropriate hydrogen present in the exhaust gas for
producing hydroxylamine or hydroxylammonium salts proceeds by recycling into the plant for producing hydroxylamine or hydroxylammonium salts.

3. The process according to claim 2, wherein the selective removal of nitrogen monoxide in the first separation stage is carried out by selective absorption to a suitable absorbent.

4. The process according to claim 2, wherein the dinitrogen monoxide is selectively removed by pressure swing absorption to a solid or liquid absorbent.

5. The process according to claim 1, wherein the selective removal of nitrogen monoxide in the first separation stage is carried out by selective absorption to a suitable absorbent.

6. The process according to claim 5, wherein the absorbent is a transition metal-comprising solid or liquid material to which nitrogen monoxide is reversibly bound as nitrosyl complex.

7. The process according to claim 6, wherein the dinitrogen monoxide is selectively removed by pressure swing absorption to a solid or liquid absorbent.

8. The process according to claim 6, wherein the absorbent is an iron(II) sulfate solution.

9. The process according to claim 5, wherein the dinitrogen monoxide is selectively removed by pressure swing absorption to a solid or liquid absorbent.

10. The process according to claim 1, wherein the dinitrogen monoxide is selectively removed by pressure swing absorption to a solid or liquid absorbent.

11. The process according to claim 1, wherein the dinitrogen monoxide is removed by means of a suitable membrane process.

12. The process according to claim 1, wherein the dinitrogen monoxide is selectively removed by reaction to give ammonia in the presence of a suitable catalyst.

13. The process according to claim 12, wherein the ammonia obtained by reaction of dinitrogen monoxide is fed to an ammonia combustion furnace for producing nitrogen monoxide.

14. The process according to claim 1, wherein the dinitrogen monoxide is removed by reaction with hydrogen to form nitrogen and water.

15. The process according to claim 14, wherein the reaction proceeds thermally at temperatures above 500° C.

16. The process according to claim 14, wherein the reaction proceeds catalytically.

17. The process according to claim 16, wherein the reaction proceeds in the presence of catalysts which comprise as active components one or more of the metals silver, palladium, platinum or copper or one or more compounds of one or more of these metals.

18. The process according to claim 1, comprising a third separation stage in which, from the exhaust gas of the second separation stage, hydrogen is removed from nitrogen and other inert components in the process for producing hydroxylamine or hydroxylammonium salts.

19. A process for producing hydroxylamine or hydroxylammonium salts, which comprises reprocessing the exhaust gas by a process according to claim 1.

20. The process according to claim 19, wherein at least one of the valuable materials produced in the reprocessing of the exhaust gas nitrogen monoxide and hydrogen is recirculated into the plant for producing hydroxylamine or hydroxylammonium salts.

* * * * *